US012791996B2

(12) United States Patent
Werner et al.

(10) Patent No.: US 12,791,996 B2
(45) Date of Patent: Nov. 10, 2026

(54) RAIL-MOUNTED DEVICE, AUTOMATION SYSTEM AND METHOD FOR PROCESS AUTOMATION

(71) Applicant: WAGO Verwaltungsgesellschaft mbH, Minden (DE)

(72) Inventors: Falk Werner, Minden (DE); Marius Hellmeier, Minden (DE); Patrick Enns, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 701 days.

(21) Appl. No.: 17/981,105

(22) Filed: Nov. 4, 2022

(65) Prior Publication Data

US 2023/0073870 A1 Mar. 9, 2023

Related U.S. Application Data

(63) Continuation of application No. PCT/EP2021/062394, filed on May 11, 2021.

(30) Foreign Application Priority Data

May 13, 2020 (DE) .................... 10 2020 112 955.6

(51) Int. Cl.
*G05B 19/042* (2006.01)
*G05B 19/048* (2006.01)
(Continued)

(52) U.S. Cl.
CPC ....... *G05B 19/0428* (2013.01); *G05B 19/048* (2013.01); *G05B 19/058* (2013.01);
(Continued)

(58) Field of Classification Search
CPC .................. Y02P 90/02; G05B 19/058; G05B 2219/25282; G05B 19/0425;
(Continued)

(56) References Cited

U.S. PATENT DOCUMENTS 8,248,984 B2 8/2012 Loubier
8,949,665 B2 2/2015 Law et al.
(Continued)

FOREIGN PATENT DOCUMENTS

CN 101231783 A 7/2008
CN 101639686 A 2/2010
(Continued)

OTHER PUBLICATIONS

Siemens, "SITOP Power Supplies: PSU8600 power supply systems manual", Apr. 2016 (Year: 2016).*
(Continued)

*Primary Examiner* — Ryan Johnson
(74) *Attorney, Agent, or Firm* — Muncy, Geissler, Olds & Lowe, P.C.

(57) ABSTRACT

A rail-mounted device for automation systems having at least one local bus interface for connecting the rail-mounted device to a local bus of an automation system, and a power supply unit that has at least one input and at least one output through which the power supply unit is connectable to at least one electronic control unit of the automation system. The power supply unit of the rail-mounted device is equipped to detect a voltage drop or a loss of voltage at the input of the power supply unit and to provide a supply voltage at a minimum of one output of the power supply unit over a limited period by means of the electrical energy stored in the energy storage device. The rail-mounted device has at least one signal output for indicating a voltage drop or voltage loss detected at the input of the power supply unit.

11 Claims, 3 Drawing Sheets

(51) Int. Cl.
*G05B 19/05* (2006.01)
*G06F 1/30* (2006.01)
*H02J 9/06* (2006.01)

(52) U.S. Cl.
CPC ................ *G06F 1/30* (2013.01); *H02J 9/061* (2013.01); *G05B 2219/15062* (2013.01); *G05B 2219/24024* (2013.01); *G05B 2219/25428* (2013.01)

(58) Field of Classification Search
CPC .. G05B 19/0428; G05B 19/4185; G05B 9/02; G05B 2219/25428; G05B 2219/15062; H02J 9/061; H02J 9/06; H02J 9/062; G06F 1/263; G06F 1/30
See application file for complete search history.

(56) References Cited

U.S. PATENT DOCUMENTS

| | | | | |
|---|---|---|---|---|
| 9,768,641 | B2 | 9/2017 | Fiedler et al. | |
| 10,567,191 | B2 | 2/2020 | Pohl et al. | |
| 10,892,909 | B2 | 1/2021 | Bertram | |
| 2003/0058595 | A1* | 3/2003 | Murabayashi .......... | H02J 1/102 361/90 |
| 2005/0075817 | A1 | 4/2005 | Kah et al. | |
| 2008/0174178 | A1 | 7/2008 | Jakobsson et al. | |

FOREIGN PATENT DOCUMENTS

| | | | |
|---|---|---|---|
| CN | 102081391 | A | 6/2011 |
| DE | 19929804 | A1 | 1/2000 |
| DE | 19929804 | B4 | 9/2004 |
| DE | 10344088 | A1 | 8/2005 |
| DE | 102009004973 | A1 | 7/2010 |
| DE | 102011076708 | A1 | 12/2012 |
| DE | 102018108309 | A1 | 10/2019 |
| EP | 0984344 | A1 | 3/2000 |
| EP | 3455681 | B1 | 8/2019 |
| JP | 2004153890 | A | 5/2004 |
| JP | 2010055472 | A | 3/2010 |

OTHER PUBLICATIONS

Khan, Nadir Ilyas, Michael Campos, and Samantha Bituen. “Industry Automation and Controls Lab.” (2019). (Year: 2019).*

International Search Report dated Jul. 21, 2021 in corresponding application PCT/EP2021/062394.

Bicker. “Benutzerhandbuch DC2412-UPSD DC2412-UPS-LDD UPSIC-1205D UPSIC-2403D” Mar. 6, 2019, retrieved from the internet Jul. 7, 2021.

International Preliminary Report on Patentability dated Nov. 15, 2022 in corresponding application PCT/EP2021/062394.

* cited by examiner

RAIL-MOUNTED DEVICE, AUTOMATION SYSTEM AND METHOD FOR PROCESS AUTOMATION

This nonprovisional application is a continuation of International Application No. PCT/EP2021/062394, which was filed on May 11, 2021, and which claims priority to German Patent Application No. 10 2020 112 955.6, which was filed in Germany on May 13, 2020, and which are both herein incorporated by reference.

BACKGROUND OF THE INVENTION

Field of the Invention

The present invention relates to a rail-mounted device for automation systems according to the preamble of claim 1, an automation system, as well as a method for process automation.

Description of the Background Art

Automation systems and the program logic of the automation systems make it possible to automate processes to be carried out by a plant to the greatest extent possible, in order to thus be able to autonomously carry out control and regulation of the plant, and consequently of the process. In addition, documentation of the process can also be carried out with the aid of an automation system, making all process steps transparent and subsequently reproducible.

Automation systems generally have a head station for this purpose that provides, by means of an interface, a local bus to which one or more rail-mounted devices are connected through appropriate interfaces. The rail-mounted devices, in turn, can be connected to sensors and/or actuators as needed, and serve to measure process states and to control the corresponding automating process. The head station generally has an electronic control unit for this purpose that is designed to carry out control tasks of the automation system and in doing so can access the appropriately connected sensors through the local bus and through actuators of the rail-mounted devices.

For the purpose of supplying power, the head station usually is connected to an electrical energy source, which supplies the head station with power. Voltage supply terminals, for example, are known for energy supply to downstream bus terminals, in order to provide a supply of power for the field level to downstream bus terminals.

In the case of a temporary voltage drop or even loss of voltage when there is a direct connection of the head station to a voltage source, however, sufficient time would no longer remain to respond to the loss of supply voltage and to carry out appropriate mechanisms and responses so that the automation system as a whole can be placed in a safe operating state. Thus, in the case of a temporary voltage drop, data that have not been stored must be saved, messages about the outage must be sent, and/or other user-defined responses must be carried out, for example.

The same also applies for the use of voltage supply terminals and the downstream bus nodes, which are provided only with an electrical supply voltage by the voltage supply terminal and can no longer be supplied with voltage in the case of a temporary voltage drop.

SUMMARY OF THE INVENTION

It is therefore an object of the present invention to provide an improved automation system as well as a rail-mounted device by making it possible to bridge a temporary voltage drop in such a manner that at least the head station can respond appropriately to the voltage drop in an application-specific manner.

According to an exemplary embodiment, a rail-mounted device for automation systems is provided that has at least one local bus interface for connecting the rail-mounted device to a local bus of an automation system. The rail-mounted device additionally has a power supply unit, which has at least one input for connecting the rail-mounted device to a voltage source on the one hand and at least one output on the other hand, through which the power supply unit is connected or can be connected to at least one electronic control unit of the automation system to deliver a supply voltage. With a generic rail-mounted device of this nature, a load, for example a head station, can thus be connected to the output of the power supply unit of the rail-mounted device in order to supply the same with voltage with the aid of the rail-mounted device.

The power supply unit of the rail-mounted device can be designed in this case such that the appropriate desired voltage for the load in question is present at the output and, moreover, can have the characteristics of a voltage supply terminal with regard to the provision of a supply voltage at the output.

The power supply unit of the rail-mounted device for automation systems can include an energy storage device for storing electrical energy, wherein the power supply unit additionally is equipped to detect a voltage drop and/or a loss of voltage at the input of the power supply unit and to provide a supply voltage at the output of the power supply unit over a limited period by means of the electrical energy stored in the energy storage device.

It becomes possible by this means that a supply voltage continues to be provided for a limited period, at least at the output of the power supply unit, in the event of a detected voltage drop or voltage loss at the input of the power supply unit so that loads connected to the output of the power supply unit, as for example a head station, also continue to be supplied with electrical energy, and consequently the temporary voltage drop or voltage loss can be bridged accordingly.

The rail-mounted device can have a signal output for indicating the voltage drop or voltage loss detected at the input of the power supply unit so that a load that is connected to the signal output gets an indication of the temporary voltage drop or voltage loss and can initiate appropriate actions.

With the aid of such a voltage-buffered rail-mounted device for automation systems, it becomes possible not only to temporarily bridge a voltage drop or voltage loss, but also to indicate such a temporary voltage drop or voltage loss to the relevant loads so that they can initiate appropriate application-specific actions during the temporary bridging by the rail-mounted device according to the invention so as to be able to be safely switched off at the end of the bridging time if the supply of power has not been restored. With such a voltage-buffered rail-mounted device, it is thus possible to prevent data that have not been stored, for example on the head station, from being lost or to prevent the automation system from entering an unsafe state or an indeterminate state.

The signal output for indicating the detected voltage drop or voltage loss can be an independent signal output that is physically, mechanically, or structurally separated from other terminals and interfaces, and to which an appropriate signaling conductor is connected. This signaling conductor is then connected to the appropriate device, for example a head station.

The signal output can be part of the local bus interface so that the detected voltage drop or voltage loss are transmitted through the local bus to the devices connected thereto, for example the head station, based on an appropriate signaling protocol. In this case, a physically, mechanically, or structurally separated signal output to the voltage-buffered rail-mounted device can be dispensed with, since the indicating of the detected voltage drop or voltage loss takes place through the already-existing local bus interface. An appropriate communication protocol for indicating can be used on the local bus for this purpose. In this case, the signal output of the voltage-buffered rail-mounted device is an integral part of the local bus interface and is formed thereby, wherein the indicating takes place through the local bus interface and the local bus connected thereto.

The rail-mounted device can be a head station with electronic control unit or a terminal block that is distinct from a head station of an automation system. If the rail-mounted device is a head station with an electronic control unit, then the signal output for indicating a voltage drop or voltage loss detected at the input of the power supply unit can be in a direct communicating connection with the electronic control unit of the head station in order to indicate a voltage drop or voltage loss on the part of the electronic control unit of the head station.

It is of course also possible that the voltage-buffered rail-mounted device is a terminal block that is distinct from a head station and is connected or can be connected, for example through the local bus interface, to the local bus of the automation system provided by the head station.

The rail-mounted device can have a shutoff device that is equipped to interrupt the supply of power to one or more local bus nodes connected to the local bus if the power supply unit of the rail-mounted device has detected a voltage drop or a loss of voltage at the input of the power supply unit.

Since the supply of power to other local bus nodes connected to the local bus also usually takes place through the local bus, other downstream bus nodes can be switched off through the interruption of the local bus starting at the rail-mounted device according to the invention in order to thus make sufficient electrical energy available to, for example, the connected head station to bridge the voltage drop or loss so that suitable measures can also be carried out accordingly. In the event of a detected voltage drop or loss, therefore, not all local bus nodes of the automation system are still supplied with electrical energy by the head station, but instead only those bus nodes arranged upstream of the rail-mounted device. Consequently, the arrangement of the rail-mounted device according to the invention within the automation system can determine the choice of which local bus nodes are still supplied with electrical energy in the event of a voltage drop or loss and which are not.

The shutoff device for terminating the local bus in the event of a detected voltage drop or voltage loss can be designed such that the communication of process data through the local bus continues to be possible. Communication through the local bus in the event of a termination by the rail-mounted device according to the invention is then ultimately possible up to the latter.

By this means, the head station and a selection of appropriate local bus nodes are still capable of taking suitable actions and, if applicable, exchanging data through the local bus in the event of a voltage drop or voltage loss. Thus, for example, not-yet-stored data of local bus nodes that are still active can be transmitted to the head station so that the latter accordingly analyzes and/or stores the data then received.

Furthermore, the object is also attained by a head station that has an electronic control unit that is designed to carry out control tasks of the automation system. The head station additionally has at least one local bus interface in order to connect the head station to a local bus of an automation system or to provide such a local bus by means of the local bus interface at the head station. In this case the head station can be equipped such that the local bus is provided for other bus nodes through the local bus interface so that the head station accordingly controls transmitting and receiving on the local bus. In addition, the head station has a power supply unit that has at least one input for connecting the head station to a voltage source.

According to an example, the head station now has a signal input with which a detected voltage drop or voltage loss of the supply voltage can be indicated to the head station, wherein the electronic control unit of the head station is equipped to execute an emergency program in order to transfer the head station and/or the automation system into a safe state on account of a voltage drop or voltage loss indicated through the signal input.

It thus becomes possible with the aid of the head station to identify a voltage drop or voltage loss on the basis of a separate indication that is independent of a possible detection of a voltage drop or voltage loss at the power supply unit, and preferably is provided apart from it, so that the head station can then execute an emergency program based on the indication of a voltage drop or voltage loss in order to switch into a safe operating state. In particular, this is advantageous when the head station works together with the above-described rail-mounted device so that a voltage drop or voltage loss can be indicated to the head station through the signal input while the rail-mounted device bridges the voltage drop or voltage loss over a limited period and continues to supply the head station with electrical energy while the emergency program is executed on the electronic control unit of the head station.

The signal input for indicating a voltage drop or voltage loss can be an independent signal input that is physically, mechanically, or structurally separated from other terminals and interfaces, and to which an appropriate signaling conductor is connected.

The signal input can be part of the local bus interface of the head station so that the detected voltage drop or voltage loss is indicated to the head station through the local bus based on an appropriate signaling protocol. In this case, a physically, mechanically, or structurally separated signal input at the head station can be dispensed with, since the indicating of the detected voltage drop or voltage loss takes place through the already-existing local bus interface and the local bus that is formed. An appropriate communication protocol for indicating can be used on the local bus for this purpose. In this case, the signal input of the head station is an integral part of the local bus interface and is formed thereby, wherein the indicating takes place through the local bus interface and the local bus connected thereto.

The head station can be equipped to obtain at least some data from local bus nodes connected to the local bus after the indication of a voltage drop or voltage loss, and to then store these obtained data in a persistent memory so that the data are safely stored after the limited period of the bridging after loss of the power supply, if applicable.

The head station can have a shutoff device that is equipped to interrupt the supply of power to one or more local bus nodes connected to the local bus if a detected voltage drop or voltage loss of the supply voltage is indicated to the head station through the signal input. It becomes possible by this means to disconnect from the supply voltage the bus nodes that are connected to the local bus by means of the head station so that sufficient capacity remains on the head station to execute the emergency program during bridging of the voltage drop or voltage loss and no electrical resources are wasted for other bus nodes that are no longer necessary.

Furthermore, the object is also attained according to an example of the invention by the automation system for process automation, wherein the automation system has at least one head station as described above and at least one voltage-buffered rail-mounted device as described above. Head station and voltage-buffered rail-mounted device are connected to one another through a local bus in this case. The automation system can, moreover, have still further terminal blocks that are arranged upstream or downstream of the voltage-buffered rail-mounted device, starting from the head station.

The output of the power supply unit of the voltage-buffered rail-mounted device is connected in this case to the input of the power supply unit of the head station, so that the voltage-buffered rail-mounted device of the head station provides a voltage. The voltage-buffered rail-mounted device in this case is connected in turn to a source of electrical energy (voltage source, for example) through an input of the power supply unit and in normal operation is supplied with electrical energy through this input. On the basis of this electrical energy supply of the voltage-buffered rail-mounted device, the head station is then supplied accordingly with electrical energy so that in normal operation the voltage-buffered rail-mounted device represents a sort of voltage source for the head station. In addition, the signal output for indicating a voltage drop or voltage loss detected at the input of the power supply unit of the voltage-buffered terminal block is connected to the signal input for indicating a voltage drop or voltage loss of the head station so that a voltage drop or voltage loss can be indicated to the head station by the voltage-buffered rail-mounted device.

The signal output and the signal input can be independent terminals or interfaces that are mechanically separated from other terminals and interfaces, and that are connected to an appropriate signaling conductor. Alternatively or in addition, provision can also be made that the signal output and the signal input are an integral part of the local bus interface of the device in question (head station and rail-mounted device) and are formed by this local bus interface. In this case, the indicating of the voltage drop or voltage loss takes place through the local bus and the respective local bus interface.

In the event of a detected voltage drop or voltage loss, the voltage-buffered rail-mounted device takes on the task of supplying energy to the head station for a limited period and indicates the detected voltage drop or voltage loss to the head station through the signal input of the head station so that the head station can, for example, execute an emergency program in order to transfer the head station and/or the automation system into a safe state.

One or more bus nodes connected to the local bus can be disconnected from the local bus via a shutoff device of the voltage-buffered rail-mounted device and are no longer supplied with electrical energy when the power supply unit of the voltage-buffered rail-mounted device detects a voltage drop or voltage loss at the input of the power supply unit.

In this case, all downstream local bus nodes of the local bus, in particular, are disconnected from the latter, wherein particularly the voltage-buffered rail-mounted device is, in particular, equipped so as to terminate the local bus in order to thus continue to maintain communication through the local bus between the head station and the voltage-buffered rail-mounted device.

Furthermore, the object is also attained by a method in which a process automation via an automation system is proposed, wherein parts of a process can be automated with the aid of the automation system. The automation system has, as already described above, a head station, a voltage-buffered rail-mounted device according to the present invention, as well as one or more rail-mounted devices, which are connected to one another by means of a common local bus. The method includes: detecting a voltage drop or voltage loss at an input of a power supply unit of the voltage-buffered rail-mounted device with which the rail-mounted device is connected to a voltage source; providing an electrical supply voltage at an output of the power supply unit of the voltage-buffered rail-mounted device from an electrical energy storage device of the voltage-buffered rail-mounted device, wherein the output of the power supply unit of the voltage-buffered rail-mounted device is connected to an input of a power supply unit of the head station; indicating the detected voltage drop or voltage loss at a signal output of the voltage-buffered rail-mounted device, wherein the signal output of the voltage-buffered rail-mounted device is connected to a signal input of the head station; and executing an emergency program by an electronic control unit of the head station when a detected voltage drop or voltage loss at the signal input of the head station has been indicated by the voltage-buffered rail-mounted device, while the head station is powered with the provided electrical supply voltage of the voltage-buffered rail-mounted device through the input of the power supply unit of the head station.

The concept of the present invention fundamentally includes here that the voltage-buffered rail-mounted device can be operated in at least two different operating modes: normal supply mode and bridging mode.

In normal supply mode, the voltage-buffered rail-mounted device has the task of a voltage supply terminal in such a manner that the power supplied from the electrical voltage source is used to provide an electrical supply voltage at the output of the voltage-buffered rail-mounted device. In the case of a voltage drop or voltage loss, the voltage-buffered rail-mounted device changes from normal supply mode into bridging mode, wherein the electrical energy stored in the electrical energy storage device is then used for a limited bridging period to provide the electrical supply voltage at the output of the voltage-buffered rail-mounted device.

It is of course possible here that the voltage-buffered rail-mounted device is equipped such that it detects a normalization of the external supply of power by the external voltage source and thus the cessation of the voltage drop or voltage loss. In this case the voltage-buffered rail-mounted device can change from bridging mode (emergency operation) back to normal supply mode again, wherein this can of course be indicated by the signal output.

The indicating of a detected voltage drop or voltage loss at the signal output of the voltage-buffered rail-mounted device is understood to mean, in particular, that the voltage-buffered rail-mounted device generates an electrical signal, which is applied to or output at the signal output of the voltage-buffered rail-mounted device. The electrical signal in this case can be, for example, a digital electrical signal that contains applicable information about the detected voltage drop or voltage loss in accordance with a predetermined communication protocol. It is also possible to indicate by means of such a signal that the supply of power through the external voltage source is now running correctly again, as a result of which the head station can take suitable actions accordingly. It is also possible that both the head station and the voltage-buffered rail-mounted device are designed such that, in the case of a normalization of the external supply of power by the external voltage source, a signal is output at the signal output of the voltage-buffered terminal block, which signal has the result at the head station that the head station switches from its switched-off operating state to the switched-on operating state so that the entire automation system can automatically be switched on when the supply of power is reestablished. The indicating can also take place through the local bus in this case so that the signal output and the signal input are an integral part of the applicable local bus interface of the device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
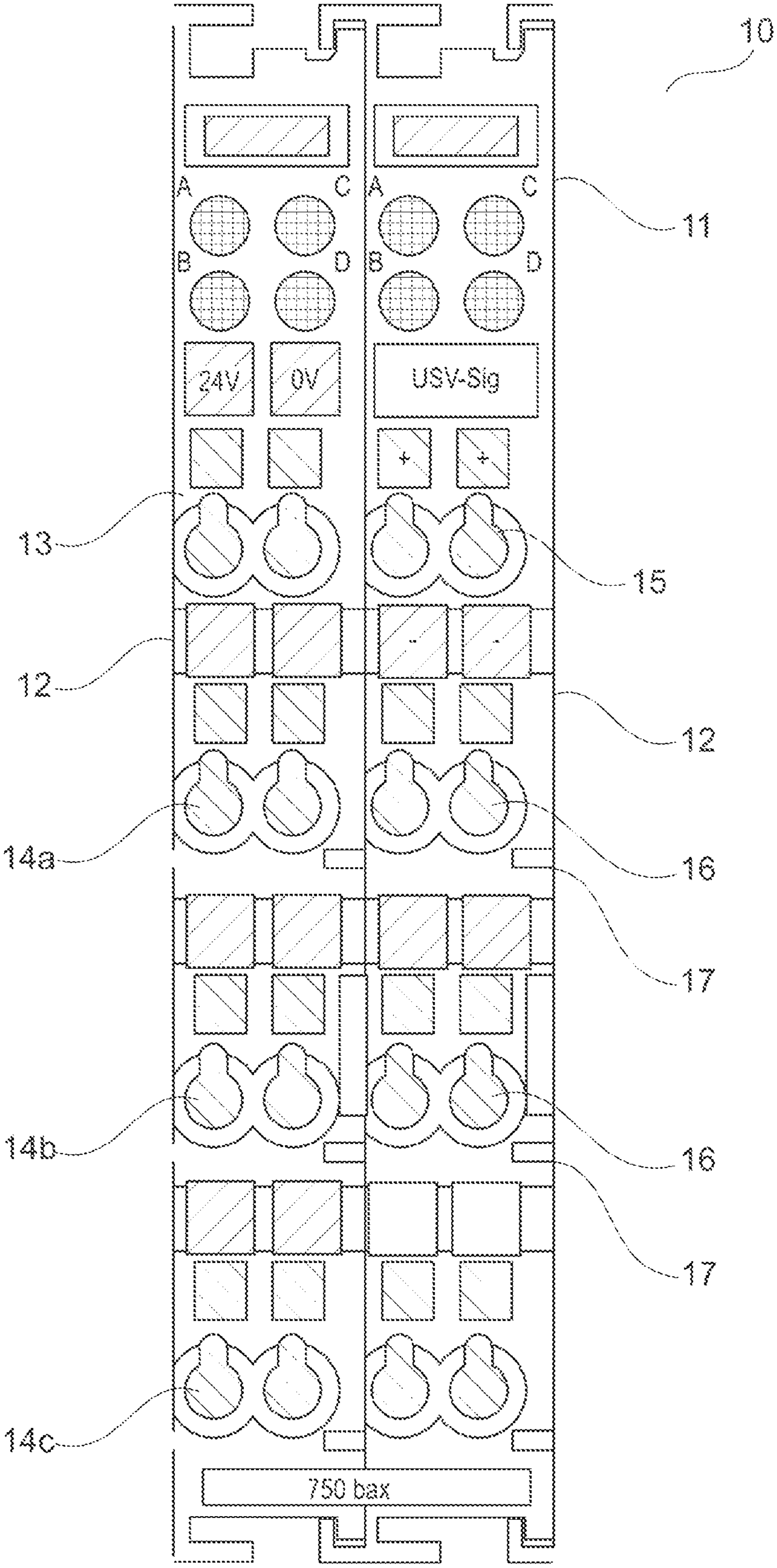
FIG. 1 is a representation of a voltage-buffered rail-mounted device in a top view.

FIG. 1 shows a voltage-buffered rail-mounted device 10 (also referred to as voltage-buffered supply terminal) in the form of a terminal block, wherein the rail-mounted device 10 has a housing 11 on which a multiplicity of terminals are provided, wherein the housing 11 has a connecting mechanism on a rear side in order to be able to attach the rail-mounted device 10 to a DIN rail, for example. A local bus interface 12 can be located on each of the two sides of the housing 11 that extend laterally from the visible front side in the plane of view in order to be able to connect the rail-mounted device 10 to a local bus of an automation system. In particular, the local bus interface 12 provided on the right side of the housing can be designed in this case such that the devices connected thereto through the local bus can be switched off, as explained later.

The rail-mounted device 10 additionally has an input 13 of a power supply unit that is arranged in the interior of the housing 11 and is not visible, which input is designed in the form of two conductor entry openings in the exemplary embodiment from FIG. 1. With the aid of these two conductor entry openings of the input 13, the rail-mounted device can be connected to an external voltage source in order to thus supply the rail-mounted device with electrical energy through the external voltage source.

In addition, multiple outputs 14*a* to 14*c* of the power supply unit of the rail-mounted device 10 are provided, each of which can be designed in the form of a conductor entry opening. The voltage-buffered rail-mounted device 10 provides an electrical supply voltage at these outputs 14*a* to 14*c* in order to thus supply the loads connected to the outputs 14*a* to 14*c* with electrical energy. In this case, the output 14*a* can be unbuffered, for example, which is to say no electrical supply voltage would be provided for emergency operation at this output 14*a* in the event of a voltage drop and voltage loss. The outputs 14*b* and 14*c*, moreover, can be buffered outputs that still provide voltage for a limited period even in the case of a voltage drop or voltage loss.

If a voltage drop or voltage loss is now detected at the input 13 of the power supply unit by the rail-mounted device 10, then the rail-mounted device 10 switches from a normal supply mode to a bridging mode in which the electrical supply voltage that is provided at the outputs 14*b* and 14*c* for a limited period is fed from an electrical energy storage device of the rail-mounted device 10. The electrical energy storage device in this case can be arranged inside the housing 11 of the rail-mounted device or be appropriately connected to such a device. The limited period within which the electrical supply voltage can still be provided at the outputs 14*b* and 14*c* in bridging mode depends here on the capacity of the energy storage device and the loads to be supplied in bridging mode.

In addition, the rail-mounted device 10 has a signal output 15 at which an electrical signal is output in order to appropriately indicate a voltage drop or voltage loss and thus inform a connected load that the outputs 14*b* and 14*c* are now powered from the electrical energy storage device and the rail-mounted device is consequently working in bridging mode. In the simplest case, it is possible here that the signal output is an NO output (Normally Open output), which is closed by means of a relay in normal supply mode, wherein the presence of an external voltage source is an essential prerequisite for the closing of the relay. As a result, a control voltage is continuously present at the signal output 15 in normal supply mode, indicating that everything is in order.

If the rail-mounted device 10 changes from normal supply mode to bridging mode, then the relay lacks a necessary supply voltage so that the signal output 15 switches to the open state. Control voltage is therefore no longer present at the signal output 15, which can be interpreted by the relevant load to mean that the voltage-buffered supply terminal 10 has switched to bridging mode.

It is also possible, however, that digital signals are transmitted through the signal output 15 on the basis of an appropriate protocol, by which means still more information concerning the voltage drop or voltage loss can be transmitted to the desired load.

Alternatively or in addition, it is also possible, however, that the indicating takes place through the local bus interface 12 on the local bus so that a device connected to the local bus, such as a head station, gets an indication through the local bus of the voltage drop or voltage loss. This is especially advantageous when the head station has no corresponding additional signal input for indicating the voltage drop or voltage loss, for example.

In addition, the rail-mounted device can also have field supply terminals 16 in order to be able to connect field devices such as sensors or actuators, for example. The field supply terminals can be configured or used as inputs or outputs. The electric potential is usually forwarded through the adjacent blade contacts 17 to the downstream terminals (which are arranged on the right, next to the rail-mounted device 10). In this case, one of the conductor contacts, for example the second conductor contact in each case, can also be used as an output.

Figure 2:
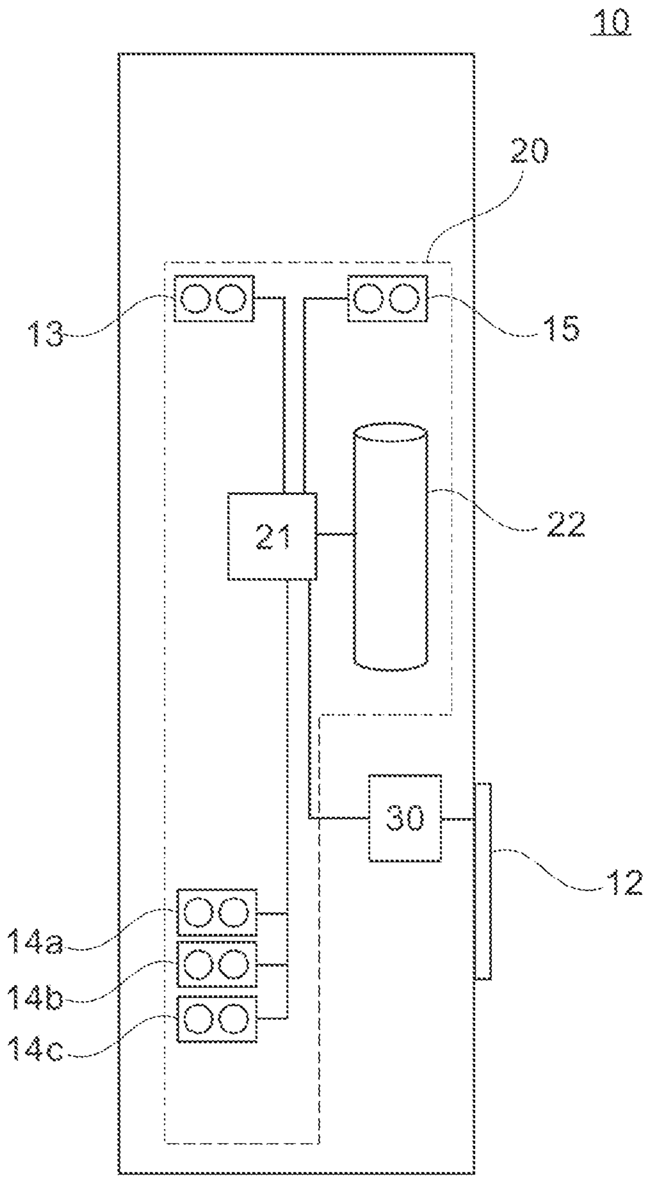
FIG. 2 is a schematic representation of the voltage-buffered rail-mounted device.

FIG. 2 shows the schematic structure of the rail-mounted device 10. The power supply unit 20, which is located inside the housing of the rail-mounted device 10 in the exemplary embodiment, has the components already known from FIG. 1 such as input 13 for connecting the rail-mounted device 10 to an external energy source, outputs 14 for supplying loads connected to the rail-mounted device 10, as well as a signal output 15 for indicating a voltage drop or voltage loss. The power supply unit 20 additionally has a control module 21, which is designed to detect a voltage drop or voltage loss at the input 13 of the power supply unit 20 and, moreover, is equipped so as to switch the rail-mounted device 10 from normal supply mode to bridging mode and back. In normal supply mode, the supply of the outputs 14*a*, 14*b*, and 14*c* is implemented by the control module 21 through the external energy source connected to the input 13 of the power supply unit 20. In bridging mode, in contrast, the supply of the buffered outputs 14*b* and 14*c* is fed by the electrical energy stored in the electrical energy storage device 22, wherein a corresponding signal is simultaneously provided at the signal output 15 by the control module 21 in order to indicate the change from normal supply mode to bridging mode to units connected to this signal output 15.

The control module 21 is additionally in signal connection with a shutoff device or a shutoff module 30, wherein the shutoff device or the shutoff module 30 is connected to the control logic of the local bus interface 12. Through the local bus interface 12, additional terminal blocks can be connected to the voltage-buffered supply terminal 10, which is designed strictly as a built-in unit, so that they can be connected through this local bus interface 12 to the local bus provided by the head station of the automation system (see FIG. 3).

In the exemplary embodiment from FIG. 2, the shutoff device 30 is designed such that it manipulates the local bus interface 12 on the right side of the housing of the rail-mounted device 10 in such a manner that the terminal blocks connected to the local bus on the right side of the rail-mounted device 10 are disconnected from the local bus. This has the advantage that additional loads that are supplied with electrical energy through the local bus are switched off so that the electrical energy stored in the energy storage device 22 can be used for the emergency program of the head station and thus correspondingly for the essential functions in bridging mode. If applicable, selected upstream local bus nodes can also continue to be supplied with the electrical energy stored in the energy storage device 22, for example for the purpose of executing an emergency program.

In the exemplary embodiment from FIG. 2, only the right-hand local bus interface 12 is manipulated in this case so that it can be determined, on the basis of the position where the rail-mounted device 10 is installed within the automation system as a whole, which terminal blocks connected to the local bus ultimately should still be supplied with electrical energy even in bridging mode and which terminal blocks will be taken off the network in the event of a voltage drop or voltage loss. It is possible in this case that the shutoff device likewise disconnects at least one of the field supply outputs 16 and/or the blade contacts 17 (FIG. 1) from the electrical power supply. It is likewise possible in this case for it to be selectable in advance which field supply outputs or blade contacts are disconnected from the power supply in bridging mode and which continue to be supplied with power.

It is accordingly advantageous and encompassed by the core concept of the present invention for the shutoff device to be designed such that terminal blocks connected to a first interface remain connected to the local bus while terminal blocks connected to a second local bus interface are disconnected from the local bus when a voltage drop or voltage loss is detected.

Figure 3:
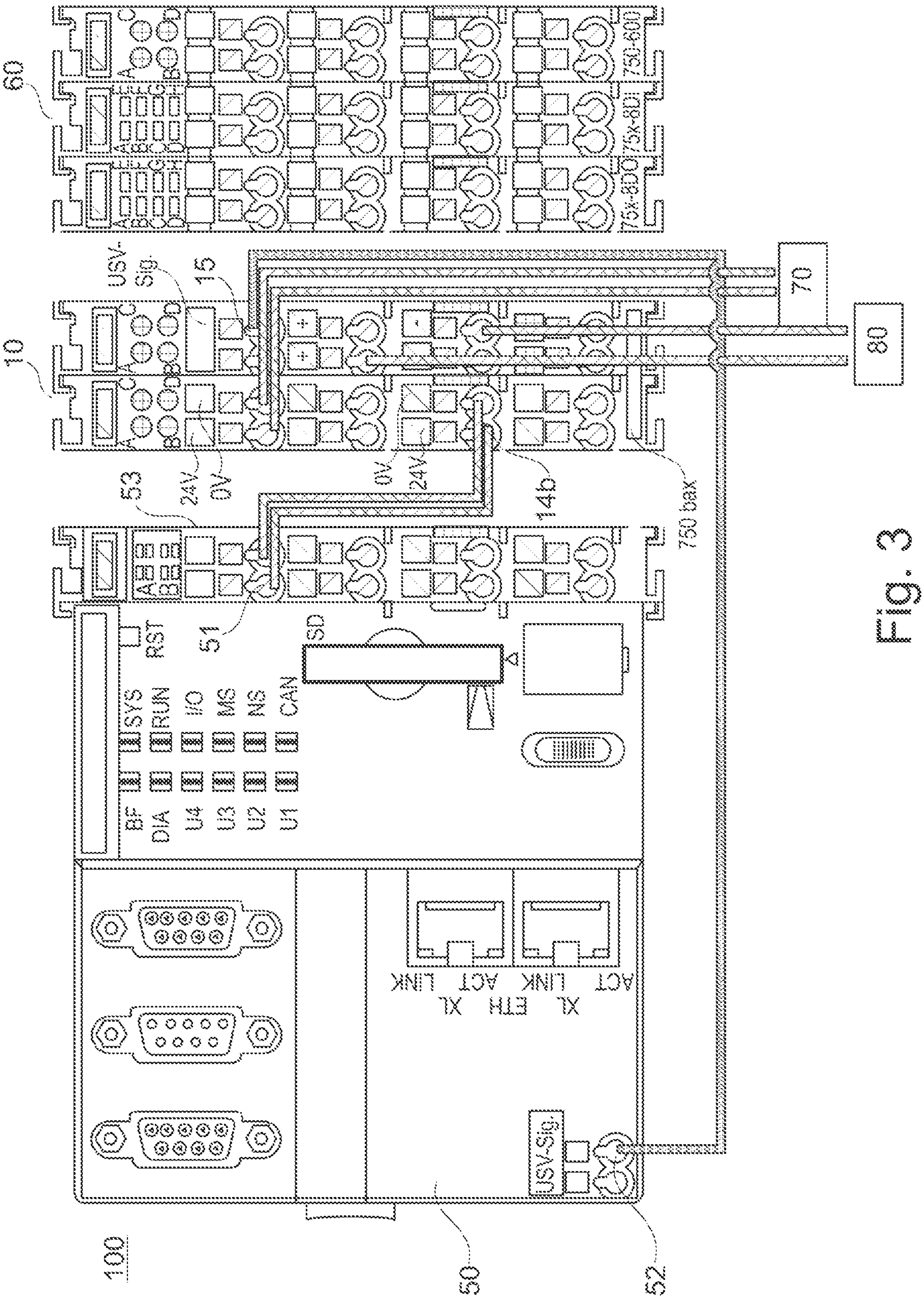
FIG. 3 is a representation of an automation system with a voltage-buffered rail-mounted device in a wiring example.

FIG. 3 shows a wiring example of an automation system 100, which has a head station 50, a rail-mounted device 10 as voltage-buffered supply terminal, as well as additional terminal blocks 60. For better understanding, the essential components—head station 50, rail-mounted device 10, as well as additional terminal blocks 60—are represented as distinct from one another, wherein they are adjacent to one another in operation so that each terminal block or each rail-mounted device 10 and 60 is connected to the local bus provided by the head station 50.

The rail-mounted device 10 now is initially connected to an external energy source 70 so that a corresponding external supply of power is provided to the rail-mounted device 10 by this means. Schematically indicated in FIG. 3 are corresponding field devices 80, such as, e.g., actuators or sensors, connected to the field supply terminals 16 of the rail-mounted device 10.

The power supply for the head station 50 is now connected to the voltage-buffered output 14*b* of the rail-mounted device 10 so that the output 14*b* of the voltage-buffered supply terminal 10 terminates in the input 51 of the head station for the supply of power to the head station. Consequently, the head station 50 is supplied with electrical energy through its input 51 by means of this voltage-buffered output 14*b* of the rail-mounted device 10.

In addition, the head station 50 has a signal input 52, which is connected to the signal output 15 of the rail-mounted device 10. Furthermore, the head station 50 has a local bus interface 53 with which a local bus can be provided or with which the head station can be connected to a local bus.

In normal supply mode, the head station 50 is supplied through its input 51 with electrical energy based on the external energy source 70. If a voltage drop or a voltage loss of the external energy source 70 is detected by the rail-mounted device 10, however, then the rail-mounted device 10 switches from normal supply mode to bridging mode, in which the supply of power provided at the output 14*b* is implemented by the energy storage device 22 (FIG. 2). In bridging mode, furthermore, a corresponding signal is provided at the signal output 15 of the rail-mounted device 10, which is received or can be detected through the signal input 52 of the head station 50, so that the head station 50 gets an indication of the switch of the rail-mounted device 10 from normal supply mode to bridging mode.

The indicating can also take place through the local bus, however. The voltage-buffered rail-mounted device 10 sends a corresponding signal through the local bus by means of its local bus interface 12 as signal output. The head station 50 receives the signal from the local bus by means of its local bus interface 53 and carries out the necessary actions.

The head station 50 is now designed such that it executes a corresponding emergency program upon indication of a bridging mode in order to persistently store data that have not yet been saved, if applicable retrieves data from other connected devices, and possibly also shuts down the operating system in order to transfer the entire automation system 100 into a safe operating state.

The rail-mounted device 10 is additionally designed such that the additional terminal blocks located to the right of the rail-mounted device 10 are disconnected from the local bus, as a result of which the supply of power to the additional terminal blocks 60 through the local bus usually is interrupted as well. Moreover, the rail-mounted device can be designed such that the terminal blocks located between the head station 50 and the rail-mounted device 10 are not disconnected from the local bus and continue to be supplied with electrical energy by the head station 50 through the local bus, so that it can be determined, on the basis of the position where the rail-mounted device 10 is installed within the automation system 100, which additional local bus nodes of the automation system 100 are still to be supplied with electrical energy in bridging mode and which are not.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A voltage-buffered rail-mounted device for an automation system, the voltage-buffered rail-mounted device comprising:

at least one local bus interface to connect the voltage-buffered rail-mounted device to a local bus of an automation system; and a power supply unit that comprises at least one input to connect the voltage-buffered rail-mounted device to an external voltage source and outputs through which the power supply unit is connectable to an input of a power supply unit of a head station to provide a supply voltage thereto, the voltage-buffered rail-mounted device being a terminal block that is distinct from the head station, wherein the power supply unit of the voltage-buffered rail-mounted device includes or is connectable to an energy storage device for storing electrical energy, wherein the power supply unit of the voltage-buffered rail-mounted device detects a voltage drop or a loss of voltage of a voltage provided by the external voltage source at the at least one input of the power supply unit and provides a supply voltage to at least one of the outputs of the power supply unit over a limited period via the electrical energy stored in the energy storage device, and wherein the voltage-buffered rail-mounted device has at least one signal output to indicate the voltage drop or voltage loss of the voltage provided by the external voltage source detected at the at least one input of the power supply unit, and wherein the voltage-buffered rail-mounted device has a shutoff device that is configured to interrupt a supply of power to one or more local bus nodes connected to the local bus, and that are downstream of the voltage-buffered rail-mounted device, when the power supply unit of the voltage-buffered rail-mounted device detects the voltage drop or the loss of voltage at the at least one input of the power supply unit, while continuing to supply power from the head station to local bus nodes located between the head station and the voltage-buffered rail-mounted device.

2. The voltage-buffered rail-mounted device according to claim 1, wherein the shutoff device is configured such that a communication of process data through the local bus continues to be possible when the voltage drop or the voltage loss is detected.

3. A head station for an automation system, the head station comprising:

an electronic control unit that is designed to carry out control tasks of the automation system;

at least one local bus interface to connect the head station to a local bus of the automation system; and a power supply unit that has at least one input to connect the head station to an output of a voltage-buffered rail-mounted device that is distinct from the head station, wherein the head station has a signal input through which a detected voltage drop or voltage loss of a supply voltage is indicated to the head station, and wherein the electronic control unit of the head station executes an emergency program in order to transfer the head station into a safe state in an event of the voltage drop or voltage loss of a voltage provided by the external voltage source to the voltage-buffered rail-mounted device indicated through the signal input, and wherein the voltage-buffered rail-mounted device has a shutoff device that is configured to interrupt a supply of power to one or more local bus nodes connected to the local bus, and that are downstream of the voltage-buffered rail-mounted device, when a power supply unit of the voltage-buffered rail-mounted device detects the voltage drop or the loss of voltage, while continuing to supply power from the head station to local bus nodes located between the head station and the voltage-buffered rail-mounted device.

4. The head station according to claim 3, wherein the head station obtains at least some data from local bus nodes connected to the local bus after the indication of the voltage drop or voltage loss.

5. An automation system for process automation, the automation system comprising:

at least one head station according to claim 3; and at least one voltage-buffered rail-mounted device, wherein the head station and the voltage-buffered rail-mounted device are connected to a common local bus through their respective local bus interfaces, wherein an output of a power supply unit of the voltage-buffered rail-mounted device is connected to the at least one input of the power supply unit of the head station, wherein at least one signal output of the power supply unit of the voltage-buffered rail-mounted device is connected to the signal input of the head station, so that when the voltage drop or voltage loss of the voltage provided by the external voltage source to the power supply unit of the voltage-buffered rail-mounted device is detected at an input of the power supply unit of the voltage-buffered rail-mounted device, the voltage drop or voltage loss is communicated from the voltage-buffered rail-mounted device to the head station.

6. The automation system according to claim 5, wherein additional terminal blocks, which are connected to the common local bus through a respective local bus interface, are provided downstream of the rail-mounted device starting from the head station.

7. The automation system according to claim 6, wherein the voltage-buffered rail-mounted device is equipped via the shutoff device to interrupt the supply of power to all downstream local bus nodes of the common local bus.

8. A method for process automation via an automation system, wherein the automation system comprises a head station, a voltage-buffered rail-mounted device, and one or more additional rail-mounted devices, which are connected to one another via a common local bus, the method comprising:

detecting a voltage drop or voltage loss at an input of a power supply unit of the voltage-buffered rail-mounted device with which the voltage-buffered rail-mounted device is connected to an external voltage source;

providing, when the voltage drop or voltage loss of a voltage provided by the external voltage source to the voltage-buffered rail-mounted device is detected, an electrical supply voltage at an output of the power supply unit of the voltage-buffered rail-mounted device from an electrical energy storage device, the output of the power supply unit of the voltage-buffered rail-mounted device being connected to an input of a power supply unit of the head station;

indicating the detected voltage drop or voltage loss at a signal output of the voltage-buffered rail-mounted device, the signal output of the voltage-buffered rail-mounted device being connected to a signal input of the head station;

executing an emergency program by an electronic control unit of the head station when the detected voltage drop or voltage loss has been indicated by the voltage-buffered rail-mounted device to the signal input of the head station, while the head station is powered with the electrical supply voltage from the electrical energy storage device through the input of the power supply unit of the head station; and interrupting, by a shutoff device of the voltage-buffered rail-mounted device, a supply of power to local bus nodes downstream of the voltage-buffered rail-mounted device, while continuing to supply power from the head station to local bus nodes located between the head station and the voltage-buffered rail-mounted device.

9. The method according to claim 8, wherein the supply of power to the local bus nodes downstream of the voltage-buffered rail-mounted device is interrupted after the detection of the voltage drop or voltage loss.

10. The method according to claim 9, wherein the common local bus is terminated via the shutoff device of the voltage-buffered rail-mounted device after the detection of the voltage drop or voltage loss so that a communication of process data through the common local bus continues to be possible.

11. The method according to claim 8, wherein at least some data from local bus nodes linked and connected to the common local bus are transmitted to the head station after the indication of the voltage drop or voltage loss at the signal input of the head station.

* * * * *